United States Patent
Yano

(10) Patent No.: US 6,560,022 B2
(45) Date of Patent: May 6, 2003

(54) DIFFUSING ADHESIVE LAYER, OPTICAL MEMBER AND LIQUID-CRYSTAL DISPLAY DEVICE

(75) Inventor: Shuuji Yano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/756,878

(22) Filed: Jan. 10, 2001

(65) Prior Publication Data

US 2001/0002153 A1 May 31, 2001

Related U.S. Application Data

(62) Division of application No. 09/588,693, filed on Jun. 7, 2000.

(30) Foreign Application Priority Data

Jun. 7, 1999 (JP) ............................................. 11-159663
Jun. 7, 1999 (JP) ............................................. 11-159664

(51) Int. Cl.$^7$ ................................................ G02B 5/02
(52) U.S. Cl. ........................ 359/599; 359/613; 362/31
(58) Field of Search .............................. 359/599, 707, 359/601, 613–614; 349/57–65, 112, 134, 96; 362/26, 31

(56) References Cited

U.S. PATENT DOCUMENTS

| | | | | |
|---|---|---|---|---|
| 3,609,000 A | * | 9/1971 | Miyano ....................... | 359/599 |
| 4,268,127 A | * | 5/1981 | Oshima et al. ............. | 359/599 |
| 5,706,134 A | * | 1/1998 | Konno et al. ................ | 359/599 |
| 5,751,388 A | | 5/1998 | Larson ........................ | 349/96 |
| 5,808,709 A | * | 9/1998 | Davis et al. .................. | 349/65 |
| 5,831,774 A | | 11/1998 | Toshima et al. ............. | 359/707 |
| 5,880,800 A | * | 3/1999 | Mikura et al. ............... | 349/122 |

FOREIGN PATENT DOCUMENTS

| | | |
|---|---|---|
| EP | 0 696 753 A2 | 2/1996 |
| EP | 0 777 145 A2 | 6/1997 |
| JP | 63-276540 | * 11/1988 |
| WO | WO 97/01781 | 1/1997 |

\* cited by examiner

*Primary Examiner*—Thong Nguyen
(74) *Attorney, Agent, or Firm*—Sughrue Mion, PLLC

(57) ABSTRACT

A diffusing adhesive layer has a light-transmissible adhesive layer dispersively containing colorless light-transmissible particles so as to exhibit light diffusing characteristic. The light diffusing characteristic of the diffusing adhesive layer is not higher than 10% in terms of a light diffusion factor which is defined as $100 \times I_{30}/I_{10}$ when $I_{30}$ is the intensity of light transmitted in a direction inclined by 30 degrees relative to a direction of perpendicular transmission of perpendicularly incident light, and $I_{10}$ is the intensity of light transmitted in a direction inclined by 10 degrees relative to the direction of perpendicular transmission of perpendicularly incident light. Another diffusing adhesive layer has a total light transmission factor of not lower than 85% and a direct transmission factor of not higher than 30%. In an optical member, one of the diffusing adhesive layers is provided on an optical material having at least a polarizing plate or a retarder plate. In a reflection type liquid-crystal display device, the optical member and one of the diffusing adhesive layers are provided between a liquid-crystal cell and a polarizing plate.

14 Claims, 2 Drawing Sheets

DIFFUSING ADHESIVE LAYER, OPTICAL MEMBER AND LIQUID-CRYSTAL DISPLAY DEVICE

This is a divisional of application Ser. No. 09/588,693 filed Jun. 7, 2000, the disclosure of which is incorporated herein by reference.

BACKGROUND OF THE INVENTION

1. Field of the Invention

The present invention relates to a diffusing adhesive layer excellent in balance between light transmittance and diffusing characteristic and adapted for formation of a liquid-crystal display device excellent in visibility such as brightness, and an optical member using the diffusing adhesive layer.

The present application is based on Japanese Patent Applications No. Hei. 11-159663 and 159664, which are incorporated herein by reference.

2. Description of the Related Art

Heretofore known was a light diffusion type adhesive layer which was configured to contain particles having refractive indices different from one another to thereby have light diffusing characteristic so that a viewing angle for liquid-crystal display could be enlarged. However, if the diffusing characteristic was improved to attain the enlargement of the viewing angle while self-adhesive applicability excellent in reliability was satisfied, the transmittance decreased because of increase of back scattering, or the like. If the transmittance was improved, the diffusing characteristic was lowered. Hence, there was a problem that the balance between light transmittance and diffusing characteristic was hardly kept.

SUMMARY OF THE INVENTION

An object of the present invention is to develop a diffusion type adhesive layer which is excellent in balance between light transmittance and diffusing characteristic with satisfaction of self-adhesive applicability excellent in reliability and which is adapted for formation of a liquid-crystal display device excellent in visibility such as brightness.

According to the present invention, there are provided: a diffusing adhesive layer comprising a light-transmissible adhesive layer dispersively containing colorless light-transmissible particles so as to exhibit light diffusing characteristic, wherein the light diffusing characteristic of the diffusing adhesive layer is not higher than 10% in terms of a light diffusion factor which is defined as $100 \times I_{30}/I_{10}$ when $I_{30}$ is intensity of light transmitted in a direction inclined by 30 degrees relative to a direction of perpendicular transmission of perpendicularly incident light, and $I_{10}$ is intensity of light transmitted in a direction inclined by 10 degrees relative to the direction of perpendicular transmission of perpendicularly incident light; an optical member, wherein the above-mentioned diffusing adhesive layer is provided on an optical material having at least a polarizing plate or a retarder plate; and a reflection type liquid-crystal display device, wherein the above-mentioned diffusing adhesive layer is provided between a liquid-crystal cell and a polarizing plate.

According to the another aspect of the present invention, there are provided: a diffusing adhesive layer comprising a light-transmissible adhesive layer dispersively containing colorless light-transmissible particles so as to exhibit light diffusing characteristic, wherein the diffusing adhesive layer has a total light transmission factor of not lower than 85% and a direct transmission factor of not higher than 30%; an optical member wherein the above-mentioned diffusing adhesive layer is provided on an optical material having at least a polarizing plate or a retarder plate; and a reflection type liquid-crystal display device wherein the above-mentioned diffusing adhesive layer is provided between a liquid-crystal cell and a polarizing plate.

According to the present invention, there can be obtained a light diffusion type adhesive layer excellent in balance between light transmittance and diffusing characteristic on the basis of the aforementioned light diffusion factor and applicable to a self-adhesive process with good reliability. A liquid-crystal display device excellent in visibility such as brightness, especially, a reflection type liquid-crystal display device excellent in frontal brightness, can be also obtained by use of the light diffusion type adhesive layer.

According to the present invention, it is possible to obtain a liquid-crystal display device which is excellent in balance between transmitting and diffusing characteristic on the basis of the aforementioned light transmission factor and which is excellent in visibility such as brightness. Especially, it is possible to obtain a reflection type liquid-crystal display device excellent in frontal brightness. Moreover, it is possible to obtain a light diffusing adhesive layer which is applicable to a self-adhesive process with good reliability.

Further it is possible to avoid the necessity of separate provision of a light diffusing plate because the adhesive layer serves also as a light-diffusing layer, the necessity of arranging a light diffusing plate provided separately can be avoided. Hence, it is possible to achieve the reduction in size and weight by omission of members of the liquid-crystal display device.

Features and advantages of the invention will be evident from the following detailed description of the preferred embodiments described in conjunction with the attached drawings.

Figure 3:
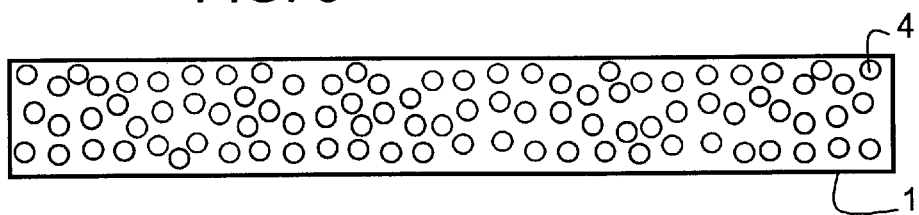
FIG. 3 shows a sectional view of the adhesive layer having light transmissible particles.

A diffusing adhesive layer according to the present invention (FIGS. 1 and 3) comprises a light-transmissible adhesive layer 1 dispersively containing colorless light-transmissible particles 4 so as to exhibit a light diffusing characteristic. The light diffusing characteristic is not higher than 10% in terms of a light diffusion factor which is defined as $100 \times I_{30}/I_{10}$ when $I_{30}$ is the intensity of light transmitted in a direction inclined by 30 degrees relative to a direction of perpendicular transmission of perpendicularly incident light, and $I_{10}$ is the intensity of light transmitted in a direction inclined by 10 degrees relative to the direction of perpendicular transmission of perpendicularly incident light.

A diffusing adhesive layer according to another aspect of the present invention comprises a light-transmissible adhesive layer dispersively containing colorless light-transmissible particles so as to exhibit a light diffusing characteristic. The diffusing adhesive layer has a total light transmission factor of not lower than 85% and a direct transmission factor of not higher than 30%.

A suitable adhesive material which exhibits a light transmitting characteristic may be used for the formation of the diffusing adhesive layer. The adhesive material is not particularly limited in kind. Incidentally, examples of the adhesive material may include rubber-based adhesives, acrylic adhesives, silicone adhesives, vinyl-alkyl ether adhesives, polyvinyl alcohol adhesives, cellulose adhesives, etc.

Figure 5:
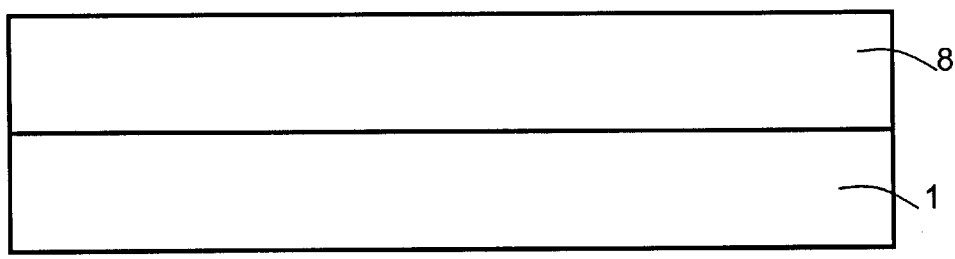
FIG. 5 shows a transparent adhesive layer on the diffusing adhesive layer.

A material which is excellent in light transmitting characteristics is preferable as the adhesive material for forming the adhesive layer, and in consideration of weather resistance, etc., an acrylic adhesive may be preferably used. Incidentally, the diffusing adhesive layer 1 may be formed in combination with a transparent adhesive layer 8 (see FIG. 5) containing no colorless particles in the form of superposition for the purpose of adjustment of the adhesive force, or the like, as occasion demands.

Suitable colorless and transparent particles may be used as the colorless light-transmissible particles to be dispersively contained in the diffusing adhesive layer. Incidentally, examples of the colorless light-transmissible particles may include inorganic particles of silica, alumina, titania, zirconia, tin oxide, indium oxide, cadmium oxide, antimony oxide, etc., and organic particles of various kinds of crosslinked or non-crosslinked polymers. The inorganic particles may be electrically conductive.

The diffusing adhesive layer may be formed by any suitable method which includes: a method of applying a mixture of the adhesive material and the colorless light-transmissible particles onto a support base constituted by an optical device, etc., for example, by using a rolling method such as a calender roll method, etc. and a coating method such as a doctor blade method, a gravure roll coater method, etc.; a method of forming a diffusing adhesive layer on a separator used as a support base in the same manner as in the foregoing method and transferring the diffusing adhesive layer onto another support base constituted by an optical device; etc.

In the above description, it is necessary in the present invention that the diffusing adhesive layer is made to contain colorless particles so as to be formed as a diffusing adhesive layer exhibiting a light diffusing characteristic of not higher than 10% in terms of the light diffusion factor. If the light diffusion factor is higher than 10%, the light diffusing power becomes so large that frontal (perpendicular) brightness runs short when a reflection type liquid-crystal display device is viewed under illumination. The light diffusion factor preferable from the point of view of balance between the enlargement of the viewing angle for good visibility due to light diffusing characteristics and the frontal brightness is in a range of from 1 to 9%, especially in a range of from 1.5 to 8%, more especially in a range of from 2 to 7%.

Figure 1:
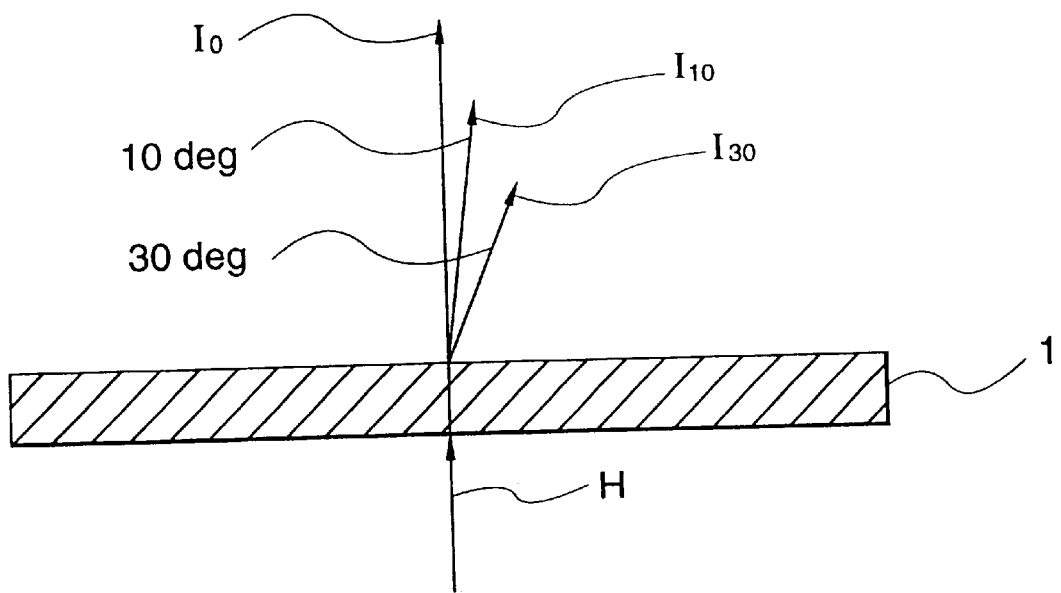
FIG. 1 shows a view for explaining calculation of a light diffusing factor.

Incidentally, the aforementioned light diffusion factor is defined as $100 \times I_{30}/I_{10}$ in which $I_{30}$ is the intensity of light transmitted in a direction inclined by 30 degrees relative to a direction $I_0$ of perpendicular transmission of light H perpendicularly incident on the diffusing adhesive layer 1 as shown in FIG. 1, and $I_{10}$ is the intensity of light transmitted in a direction inclined by 10 degrees relative to the direction $I_0$.

The mean particle size of the colorless particles which are preferably used from the point of view of the achievement of the aforementioned light diffusion factor, the controllability of adhesive force, etc. is in a range of from 1 to 10 μm, especially 9 μm or less, more especially in a range of from 2 to 8 μm. Further, the colorless particles are preferable from the point of view of suppression of back scattering to provide good diffusing characteristic in a transmitting direction are used in combination with the adhesive layer to satisfy the expression: $0.01 < |n^1 - n^2| < 0.1$, especially $|n^1 - n^2| < 0.9$, more especially $-0.08 < n^1 - n^2 < -0.01$ when $n^1$ is the refractive index of the colorless particles, and $n^2$ is the refractive index of the adhesive layer.

Incidentally, the amount of the colorless light-transmissible particles dispersively contained in the diffusing adhesive layer is determined suitably on the basis of the aforementioned light diffusion factor. The amount of the colorless light-transmissible particles generally used from the point of view of securing adhesive power is in a range of from 5 to 200 parts by weight, especially in a range of from 10 to 150 parts by weight, more especially in a range of from 15 to 100 parts by weight per 100 parts by weight of the adhesive layer (solid content). Incidentally, the thickness of the diffusing adhesive layer may be determined in accordance with the target light diffusion factor, adhesive force, etc. The thickness of the diffusing adhesive layer to be generally used is set to be not larger than 300 μm, especially in a range of from 1 to 200 μm, more especially in a range of from 5 to 100 μm.

Figure 2:
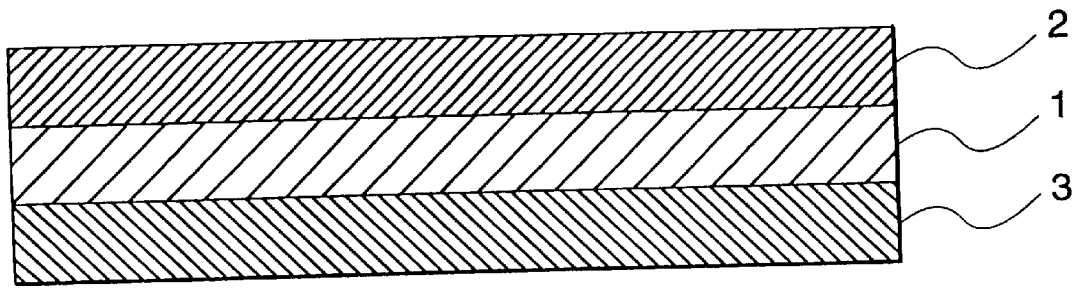
FIG. 2 shows a sectional view of an example of an optical member.

As shown in FIG. 2, the optical member may be obtained as a member in which a diffusing adhesive layer 1 according to the present invention is provided on an optical material 2. In this case, one diffusing adhesive layer may be provided on a single side of the optical material or on each of the both sides of the optical material. Moreover, when the optical material is provided as a laminate of a plurality of optical layers, one diffusing adhesive layer may be provided in a suitable intermediate position of the optical material or a plurality of diffusing adhesive layers may be provided in suitable intermediate positions of the optical material.

The optical material to be used for the formation of the optical member is not particularly limited. For example, any suitable material such as an optical material for forming a final object such as a liquid-crystal display device may be used. Incidentally, examples of the optical material may include a polarizing plate, a retarder plate, an elliptically polarizing plate made of a laminate of a polarizing plate and a retarder plate, a back-lighting device such as a light pipe, a reflection plate, a polarization separating plate, a liquid-crystal cell, an anti-glare plate, an optical path control plate such as a prism sheet or a lens sheet, and so on. Optical systems for forming the aforementioned laminate and a combination thereof are not particularly limited. For example, a laminate of the aforementioned optical materials, or the like, may be used.

Figure 4:
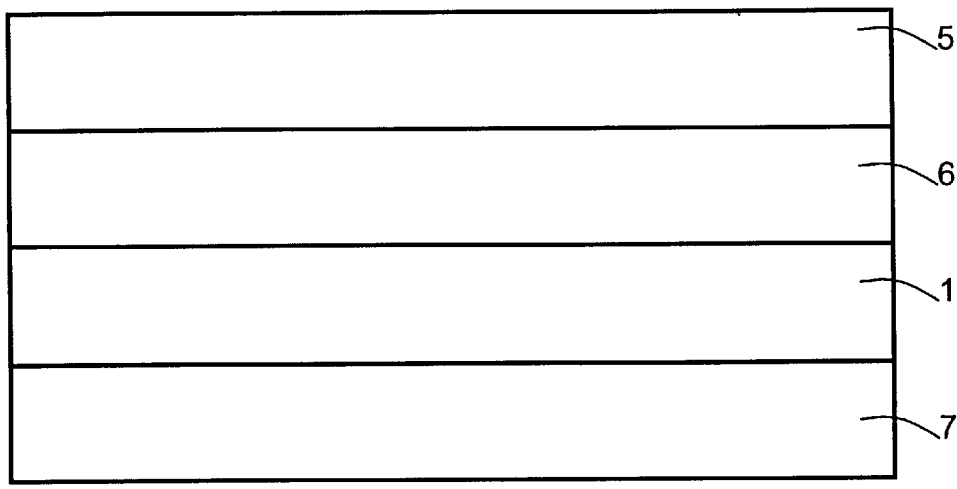
FIG. 4 shows a sectional view of another example of an optical member.

Incidentally, when the optical material is an elliptically polarizing plate (see FIG. 4) constituted by a laminate of a polarizing plate 5 and a retarder plate 6, it is preferable from the point of view of prevention of variations in the optical characteristic of transmitted light that the diffusing adhesive layer 1 is provided between the retarder-plate-side outer surface of the optical material and the liquid crystal cell 7. In this case, another adhesive layer not exhibiting diffusing characteristic is preferably used for the lamination of the polarizing plate and the retarder plate. A suitable adhesive agent such as the aforementioned adhesive material may be used for the formation of the adhesive layer.

In the above description, a suitable material may be used as the polarizing plate. Incidentally, examples of the material of the polarizing plate may include: a film obtained by a stretching process after adsorption of iodine and/or dichromatic dye onto a film of a hydrophilic high-molecular compound such as polyvinyl alcohol, partially formalized polyvinyl alcohol or partially saponified ethylene/vinyl acetate copolymer; a polarizing film made of an oriented film of polyene such as dehydrated polyvinyl alcohol or dehydrochlorinated polyvinyl chloride; and so on.

A polarizing plate obtained by coating a single side or both sides of the aforementioned polarizing film with a transparent protective layer or two transparent protective layers may be also used. Such a transparent protective film, or the like, may have various purposes of reinforcing the polarizing film, improving the heat resistance of the polarizing film, protecting the polarizing film from moisture, etc. The transparent protective film may be formed as a resin-coating layer or as a laminate layer of resin films.

On the other hand, as the retarder plate or layer, it is possible to use a suitable material which exhibits a suitable phase difference, such as a quarter-wave plate, a half-wave plate, or a compensating retarder plate exhibiting phase-difference characteristic. Incidentally, the compensating retarder plate is provided to compensate for wavelength dependence of birefringence, or the like, for the purpose of improving the visibility of the liquid-crystal display device, etc. The retarder plate may have a suitable stratified structure such as a monolayered structure or a multilayered structure with a plurality of phase-difference layers superposed on one another.

Examples of the suitable material of the retarder plate may include: stretched films of plastics such as carbonate, ester, imide, ether sulfone, sulfone, styrene, vinyl alcohol, allylate, vinyl chloride, vinylidene chloride, acrylate, amide, epoxy, cellulose, olefin such as polyethylene or polypropylene, etc.; oriented films of liquid-crystal polymers; and so on.

The thickness of the retarder plate, or the like, may be determined in accordance with the target phase difference, or the like. The thickness of the retarder plate generally used from the point of view of flexibility, reduction in thickness, or the like, is set to be in a range of from 1 to 500 $\mu$m, especially in a range of from 5 to 400 $\mu$m, more especially in a range of from 10 to 300 $\mu$m. The retarder plate may be constituted by a film having the refractive index controlled in the direction of the thickness thereof, such as a film obtained by stretching or/and contracting a polymer film adhesively bonded to a heat-shrinkable film.

A suitable material such as a known side-light type back-lighting device used in a liquid-crystal display device, or the like, may be used as the back-lighting device such as a light pipe, or the like. The light pipe is generally made of a plate-like material having an upper surface, a lower surface opposite to the upper surface, and a light-input side face made of at least one side end face between the upper and lower surfaces. The light pipe is provided so that input light given from the side face is made to exit from one of the upper and lower surfaces by diffusion, reflection, diffraction, interference, or the like, while the input light is propagated through the plate.

The light pipe may be formed by a suitable method such as a method of providing a diffusing material in the form of dots or stripes on an upper or lower surface of a transparent or semitransparent plastic plate made of suitable plastics exemplified in the aforementioned retarder plate, a method of providing an uneven structure, especially an uneven structure made of a prism array, or the like.

Any suitable material may be used as the reflection plate or layer. Incidentally, examples of the material of the reflection plate or layer may include a coating layer obtained by holding metal foil or metal powder in a binder, a reflection plate obtained by providing the coating layer on a support base, a vapor deposited layer of metal, a reflection plate obtained by providing the vapor deposited layer on a support base, and so on. Such a reflection plate or layer may be integrated with the aforementioned polarizing plate so as to be provided as a reflection type polarizing plate.

Any suitable material may be used as the polarization separating plate or layer. Incidentally, examples of the material of the polarization separating plate or layer may include a material provided to separate natural light into reflected light of linearly polarized light and transmitted light of linearly polarized light which are vertical to each other by a Brewster angle through a multilayered film having thin dielectric films superposed on one another, a material provided to separate natural light into reflected light of linearly polarized light and transmitted light of linearly polarized light which are vertical to each other through a multilayered film having thin birefringent dielectric films superposed on one another, a material provided to separate natural light into reflected light of circularly polarized light and transmitted light of circularly polarized light which are circularly polarized in the opposition direction to each other through a cholesteric liquid-crystal layer or a combination of cholesteric liquid-crystal layers different in reflection characteristic, and so on.

Any suitable material may be used as the liquid-crystal cell. Incidentally, examples of the material of the liquid-crystal cell may include liquid-crystal cells using twist nematic liquid crystal or supertwist nematic liquid crystal, liquid-crystal cells using non-twist type liquid crystal, guest-host type liquid crystal containing dispersed dichromatic dye or ferroelectric liquid crystal, and soon. Any suitable method may be used as a method of driving the liquid-crystal cell.

Incidentally, the aforementioned optical path control plate is provided to control the direction of outgoing light. A suitable material such as a lens sheet exhibiting beam-condensing characteristic in a frontal direction, a prism sheet for converting an optical path of oblique light into an optical path in a frontal direction, or the like, may be used as the optical path control plate.

The aforementioned diffusing adhesive layer or optical member according to the present invention may be used for the formation of various devices such as a reflection type liquid-crystal display device, a transmission type liquid-crystal display device, a reflection-transmission double type liquid-crystal display device, etc. For the application of the diffusing adhesive layer according to the present invention, one diffusing adhesive layer may be disposed or a plurality of diffusing adhesive layers may be disposed in one device. For the formation of such a device, another diffusing layer than the diffusing adhesive layer according to the present invention may be disposed.

For the formation of the aforementioned reflection type liquid-crystal display device, the diffusing adhesive layer or optical member according to the present invention may be preferably disposed on the visible side of the liquid-crystal cell. Especially, the diffusing adhesive layer according to the present invention may be preferably disposed as a structure in which the diffusing adhesive layer adheres to an adjacent optical layer located between the liquid-crystal cell and the polarizing plate.

Incidentally, when the diffusing adhesive layer 1 is exposed to the surface, the diffusing adhesive layer 1 may be preferably temporarily covered with a separator 3, or the like, as shown in FIG. 2, until the diffusing adhesive layer 1 adheres to a subject of adhesion. The separator may be obtained by a method of surface-treating a thin film of paper, plastic film, or the like, with a suitable releasant such as a silicone releasant, a long-chain acrylic releasant, or the like, as occasion demands.

EXAMPLE 1

Colorless light-transmissible particles having a refractive index ($n^1$) of 1.43 and a mean particle size of 4 μm were mixed with an acrylic adhesive. The resulting mixture was applied onto a separator. Thus, a diffusing adhesive layer was obtained as a layer in which 30% by weight of the colorless particles were dispersively contained in a transparent acrylic adhesive layer having a refractive index ($n^2$) of 1.47 and a thickness of 25 μm.

Comparative Example

A diffusing adhesive layer was obtained as a layer in which 15% by weight of colorless light-transmissible particles having a refractive index ($n^1$) of 1.63 and a mean particle size of 6 μm were dispersively contained in a transparent acrylic adhesive layer having a refractive index ($n^2$) of 1.47 and a thickness of 25 μm, in the same manner as in Example 1.

Evaluation Test 1

Each of the diffusing adhesive layers obtained in Example 1 and Comparative Example was examined in the light diffusion factor defined in the present invention. Further, in the condition that scattered light was made to be incident on the diffusing adhesive layer after the diffusing adhesive layer was self-adhesively bonded onto a mirror reflection plate, the frontal (normal) brightness of the mirror reflection plate was compared with the reflection intensity of a standard white plate. Incidentally, the diffusing adhesive layer was strongly bonded onto the mirror reflection plate.

The aforementioned results are shown in the following table.

|  | Light Diffusion Factor (%) | Ratio to Standard White Plate |
| --- | --- | --- |
| Example 1 | 3 | 2.2 times |
| Comparative Example | 12 | 1.5 times |

EXAMPLE 2

A diffusing adhesive layer was obtained in the same manner as in Example 1 except for that in which 33% by weight of the colorless particles were dispersively contained in a transparent acrylic adhesive layer.

Evaluation Test 2

Each of the diffusing adhesive layers obtained in Example 2 and the aforementioned Comparative Example was examined in the total light transmission factor and the direct transmission factor. Further, in the condition that scattered light was made to be incident on the diffusing adhesive layer after the diffusing adhesive layer was self-adhesively bonded onto a mirror reflection plate, the frontal (normal) brightness of the mirror reflection plate was compared with the reflection intensity of a standard white plate. Incidentally, the diffusing adhesive layer was strongly bonded onto the mirror reflection plate.

The aforementioned results are shown in the following table.

|  | Total Light Transmission Factor (%) | Direct Transmission Factor (%) | Ratio to Standard White Plate |
| --- | --- | --- | --- |
| Example 2 | 90 | 12 | 2.2 times |
| Comparative Example | 83 | 15 | 1.5 times |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical member comprising:

a polarizing plate;

a retarder plate; and a diffusing adhesive layer comprising a light-transmissible adhesive layer dispersively containing colorless light-transmissible particles so as to exhibit light diffusing characteristic, wherein said diffusing adhesive layer has a total light transmission factor of not lower than 85% and a direct transmission factor of not higher than 30%, and said polarizing plate, said retarder plate, and said diffusing adhesive layer are laminated in this order.

2. A reflection type liquid-crystal display device, wherein an optical member according to claim 1 is provided on a liquid-crystal cell.

3. An optical member according to claim 1, wherein said diffusing adhesive layer further comprises a transparent adhesive layer containing no colorless particle.

4. A reflection type liquid-crystal display device, wherein an optical member according to claim 3 is provided on a liquid-crystal cell.

5. An optical member according to claim 1, wherein a mean particle size of said colorless particles is in a range of 1 to 10 μm.

6. An optical member according to claim 5, wherein a mean particle size of said colorless particles is in a range of 2 to 8 μm.

7. An optical member according to claim 1, wherein said diffusing adhesive layer satisfies an expression: $0.01 < |n^1 - n^2| < 0.1$, when $n^1$ is a refractive index of said colorless particles and $n^2$ is a refractive index of said light transmissible adhesive layer.

8. An optical member according to claim 7, wherein said diffusing adhesive layer satisfies an expression: $-0.08 < n^1 - n^2 < -0.01$.

9. An optical member according to claim 1, wherein an amount of said colorless particles is in a range of from 5 to 200 parts by weight per 100 parts by weight of said light transmissible adhesive layer.

10. An optical member according to claim 9, wherein the amount of said colorless particles is in a range of from 10 to 150 parts by weight per 100 parts by weight of said light transmissible adhesive layer.

11. An optical member according to claim 10, wherein the amount of said colorless particles is in a range of from 15 to 100 parts by weight per 100 parts by weight of said light transmissible adhesive layer.

12. An optical member according to claim 1, wherein a thickness of said diffusing adhesive layer is not larger than 300 µm.

13. An optical member according to claim 12, wherein the thickness of said diffusing adhesive layer is in a range of from 1 to 200 µm.

14. An optical member according to claim 13, wherein the thickness of said diffusing adhesive layer is in a range of from 5 to 100 µm.

* * * * *